United States Patent
Jha et al.

(10) Patent No.: US 7,324,920 B2
(45) Date of Patent: Jan. 29, 2008

(54) SYSTEMS AND METHODS FOR ASSESSING MEASUREMENTS OF EFFECTIVENESS IN NETWORK-CENTRIC ENVIRONMENTS

(75) Inventors: Uma S. Jha, Placentia, CA (US); Michael S. Worcester, Orange, CA (US)

(73) Assignee: The Boeing Company, Chicago, IL (US)

( * ) Notice: Subject to any disclaimer, the term of this patent is extended or adjusted under 35 U.S.C. 154(b) by 160 days.

(21) Appl. No.: 11/217,157

(22) Filed: Aug. 31, 2005

(65) Prior Publication Data

US 2007/0050169 A1    Mar. 1, 2007

(51) Int. Cl.
*G06F 11/30* (2006.01)
(52) U.S. Cl. ...................................... 702/182
(58) Field of Classification Search ............ 702/182
See application file for complete search history.

(56) References Cited

U.S. PATENT DOCUMENTS 6,687,634 B2 *  2/2004  Borg ........................ 702/85

* cited by examiner

*Primary Examiner*—John Barlow
*Assistant Examiner*—Stephen J. Cherry
(74) *Attorney, Agent, or Firm*—Ingrassia Fisher & Lorenz, P.C.

(57) ABSTRACT

Systems and methods measure the effectiveness of network-centric environments. A network-centric environment is described by a computerized model that includes a plurality of parameters describing the various sensors and effectors available within the scenario. As the model is executed, numerical representations of the level of interoperability (e.g. a speed of command parameter, a situational awareness parameter, an asset utilization parameter and/or the like) are computed. A measure of effectiveness is then determined for the scenario as a function of the numerical representations. The measure of effectiveness can then be reported to a user, administrator or other use, who may use the data to compare and contrast different resources or scenarios, to design improved network centric environments, and/or for other purposes.

20 Claims, 3 Drawing Sheets

| SITUATIONAL AWARENESS WEIGHTS | | | ASSET UTILIZATION WEIGHTS | | |
|---|---|---|---|---|---|
| SPACE | Ss | 1 | SPACE | As | 0.56 |
| AIR | Sa | 0.8 | AIR | Aa | 0.7 |
| NAVY | Sn | 0.7 | NAVY | An | 0.8 |
| ARMY | Sr | 0.56 | ARMY | Ar | 1 |

| MAXIMUM INTERCEPT TIME | | | INTER-TEAM TIMELINE | | |
|---|---|---|---|---|---|
| SPACE | Tmax_s | 250 | ARMY-NAVY | Tan | 15 |
| AIR | Tmax_a | 175 | ARMY-AIR | Taa | 12 |
| NAVY | Tmax_n | 160 | ARMY-SPACE | Trs | 25 |
| ARMY | Tmax_r | 125 | AIR-NAVY | Tfn | 10 |
| | | | AIR-SPACE | Tas | 20 |
| | | | NAVY-SPACE | Tns | 22 |

| INTEROPERABILITY LEVEL | | | MAXIMUM ALLOWABLE RESOURCES | | |
|---|---|---|---|---|---|
| MAX | Lmax | 1 | SENSORS | Ns | 5 |
| MEDIUM | Lmed | 0.65 | EFFECTS | Ne | 5 |
| LOW | Llow | 0.4 | C2 | Nc | 1 |
| MIN | Lmin | 0 | | | |

| INTRA-TEAM TIMELINE | | | PROBABILITY | | |
|---|---|---|---|---|---|
| C2-SENSOR | Tcs | 2 | PROB. DETECT | Pd | 0.5 |
| SENSOR-C2 | Tsc | 5 | PROB. INTERCEPT | Pi | 0.5 |
| C2-EFFECTOR | Tce | 2 | | | |
| EFFECTOR-C2 | Tec | 4 | | | |

MOE Norm Faci Q    12

FIG. 3

SYSTEMS AND METHODS FOR ASSESSING MEASUREMENTS OF EFFECTIVENESS IN NETWORK-CENTRIC ENVIRONMENTS

TECHNICAL FIELD OF THE INVENTION

The present invention generally relates to network-centric systems, and more particularly relates to systems and methods for assessing measurements of effectiveness (MOE) in network-centric environments.

BACKGROUND OF THE INVENTION

As computing devices become increasing ubiquitous in personal, industrial, corporate and governmental settings, the interoperability between the various computers and other data processing devices becomes increasingly important. In aerospace, homeland security and military settings, for example, more and more emphasis is being placed upon "network centric operations" that leverage information sharing between aircraft, vehicles, command centers, robotic devices and/or human-operated computing devices to accomplish desired tasks such as identifying a target, gathering intelligence data, engaging an enemy and/or the like. As a result, future defense and aerospace technologies will be increasingly reliant upon information sharing and interoperability between widely differing computing systems. Similar emphasis on interoperability between disjoint systems is occurring in aerospace, industrial and other settings, as well as in the commercial marketplace.

While increased interoperability is generally thought to improve the flexibility, effectiveness and overall value of data processing systems present on the battlefield and elsewhere, quantifying this increased value can be difficult in practice. Individual devices can be readily benchmarked in terms of processing power, cost, mobility and other indicia of value. Most of these conventional metrics, however, fail to adequately account for the "intangible" benefits that result from aggregation and interoperability, including improved situation awareness, decreased response times, improved asset utilization, and/or the like. Because most current metrics evaluate systems on an individual component basis, no tools or methodologies presently exist for adequately quantifying the specific advantages of interoperability. As a result, the value provided by network-centric environments is frequently understated and/or misunderstood.

It is therefore desirable to create systems and techniques for assessing the effectiveness of network-centric systems in quantifiable terms. In addition, it is desirable to create benchmarking systems and techniques that can be used in comparing different systems, scenarios, assets, and/or other factors relating to network-centric environments. These and other desirable features and characteristics will become apparent from the subsequent detailed description and the appended claims, taken in conjunction with the accompanying drawings and this background section.

BRIEF SUMMARY OF THE INVENTION

According to various exemplary embodiments, systems and methods are provided to measure the effectiveness of network-centric environments. A network-centric environment is described by a computerized model that includes a plurality of parameters describing the various sensors and effectors available within the scenario. As the model is executed, numerical representations of the level of interoperability (e.g. a speed of command factor, a situational awareness factor, an asset utilization factor and/or the like) are computed. A measure of effectiveness is then determined for the scenario as a function of the numerical factors. The measure of effectiveness can then be reported to a user, administrator or other user, who may then use the data to compare and contrast different resources or scenarios, to design improved network centric environments, and/or for other purposes.

BRIEF DESCRIPTION OF THE DRAWING FIGURES

Exemplary embodiments will hereinafter be described in conjunction with the following drawing figures, wherein like numerals denote like elements, and FIG. 1 is a diagram of an exemplary scenario executed within a network-centric environment;

FIG. 3 is a diagram of an exemplary computer model of a network-centric scenario.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background or the following detailed description.

Various embodiments of the present invention present systems and methods for assessing measures of effectiveness based on artifacts and manifestations of interoperability in network-centric environments. Many of the techniques described below consider the capabilities, attributes, offerings and other aspects of one or more particular operational scenarios. The scenario is modeled, and a level of interoperability for the scenario is numerically quantified in any appropriate manner. The numerical representations generated by the model can be used by program managers, systems designers, analysts, customers and others to facilitate competitive analysis, trade studies, optimization of key performance parameters, system capability assessment and/or the like.

Much of the discussion contained within this detailed description and the associated drawing figures focuses on a particular exemplary embodiment that models actions and interactions involving four branches of the armed services. This example is solely to ease understanding of the broader concepts contained herein, however, which may be applied to any network-centric environment on or off of the battlefield. Indeed, the concepts proposed herein may be applied to any network-centric environment having any number of participants, resources available to the participant(s), and/or any other attributes. In particular, the exemplary data values contained herein (e.g. the data values shown in FIG. 3) are strictly exemplary, and are not intended to limit the scope of the present invention in any way. Various alternate but equivalent embodiments may therefore contain any number of participants with any number of local or external resources operating in any deterministic or probabilistic manner.

Figure 1:
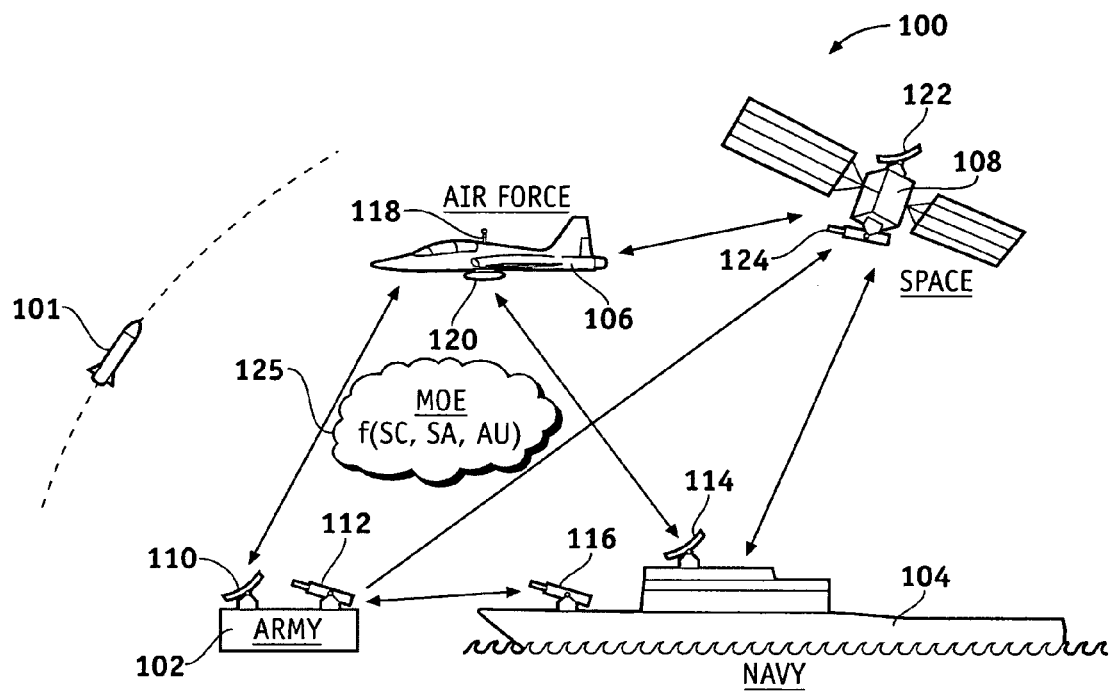

Turning now to the drawing figures and with initial reference to FIG. 1, an exemplary network-centric scenario 100 suitably includes any number of participants 102, 104, 106, 108 associated with any numbers and/or types of resources to achieve a desired goal. Scenario 100 is logically represented by a computer model (described below) that simulates the resources accessed by the various participants 102, 104, 106, 108 and that numerically assesses the interoperability of the various participants and/or resources according to one or more factors. Examples of such factors that may be computed within various embodiments include numerical representations of speed of command (SC), situational awareness (SA), asset utilization (AU) and/or the like. A measure of effectiveness (MOES) result that emphasizes the interoperability aspects of scenario 100 can then be computed from the various numerical factors, thereby resulting in an objective measurement of the scenario's effectiveness in comparison to other scenarios.

A computerized model of scenario 100 suitably contains numerical parameters describing the various participants 102, 104, 106, 108 as well as available resources 110, 112, 114, 116, 118, 120, 122, 124. In operation of scenario 100, one or more participants 102, 104, 106, 108 attempts to meet objective 101 (e.g. intercept a missile or other object) using resources available locally to that participant and/or externally via other participants. As decisions to use resources and/or take other actions are made by one or more participants 102, 104, 106, 108, the model suitably computes any number of appropriate numerical representations to assess the interoperability of the various components. The actions taken by any participant may be determined in real time (or in any other manner) by a human user (e.g. in a game-like simulation setting), and/or may be determined automatically by a computer. In the later case, multiple scenarios and decisions may be rapidly evaluated to ascertain an optimal (or more desired) network configuration, set of resources, course of action, and/or the like.

In various scenarios 100 that emphasize network-centricity, participants 102, 104, 106, 108 are encouraged to interoperate through the sharing of sensors, effectors and/or other resources to meet objective 101 in a more effective manner. This effectiveness (MOE) 125 can be quantified based upon numerical factors that are computed with consideration to the artifacts and manifestations of network-centric interoperability. While the particular numerical representations used in assessing MOE of scenario 100 may vary significantly from embodiment to embodiment, FIG. 1 numerically represents the MOE 125 of scenario 100 as a function of a speed of command (SC) factor, a situational awareness (SA) factor, and an asset utilization (AU) factor. Each of these factors can be computed in any manner from any set of available data. The SC factor, for example, may be determined as any representation of the cumulative time to execute tasks associated with scenario 100. Similarly, the SA factor may be determined as any numerical representation of the likelihood of obtaining correct environmental and/or target information, and the AU factor may be determined as any numerical representation of the likelihood of obtaining successful results. Further, each of these factors may be numerically "scaled" or "biased" using a weighting factor or the like, as appropriate for the particular environment and scenario 100 being modeled. Such information may be determined based upon domain knowledge, commanders' intent and/or other objective or subjective elements. Weighting factors may be eliminated and/or equal to unity in equivalent embodiments. Examples of particular weighting factors and a more detailed description of particular exemplary numerical representations are presented below.

MOE 125 may be computed through any combination or function of the various numerical representations to arrive at a single, numerical benchmark suitable for comparison with MOEs identified by other scenarios. In various embodiments, the SC, SA and AU factors are each formulated such that MOE 125 can be computed as a simple product of the three parameters. Alternatively, one or more parameters may be scaled to place more or less weight upon those factors, as appropriate and desired within the particular scenario 100.

Each participant 102, 104, 106, 108 logically represents an entity within scenario 100 that has command and control ($C^2$) capability, and is therefore capable of making decisions within the network-centric environment. The decisions that may be available include the decision to use one or more sensors, effectors or other resources, as well as decisions relating to interoperability with other participants. In the example set forth in FIG. 1, the various participants represent ground-based ("Army") resources 102, air-based ("Air Force" or "Air") resources 106, water-based ("Navy") resources 104, and/or space based ("Space") resources 108 acting toward the goal of intercepting an enemy object 101. In the particular model shown, each of the participants 102, 104, 106, 108 has local resources that include a radar or other sensor 110, 114, 118, 122 (respectively) and a missile battery or other effector 112, 116, 118, 124 (respectively). Different participants 102, 104, 106, 108 may have access to additional (or fewer) resources in accordance with the particular parameters of the computerized model. Other embodiments may provide additional features or attributes that are definable within the computerized model such as particular communications abilities, weapons abilities, human resources, mobility, and/or the like. Moveover, the ability of each participant 102, 104, 106, 108 to interoperate with other participants and/or to use resources associated with other participants may be defined in any appropriate manner to reflect the level of interoperability within scenario 100.

Figure 2:
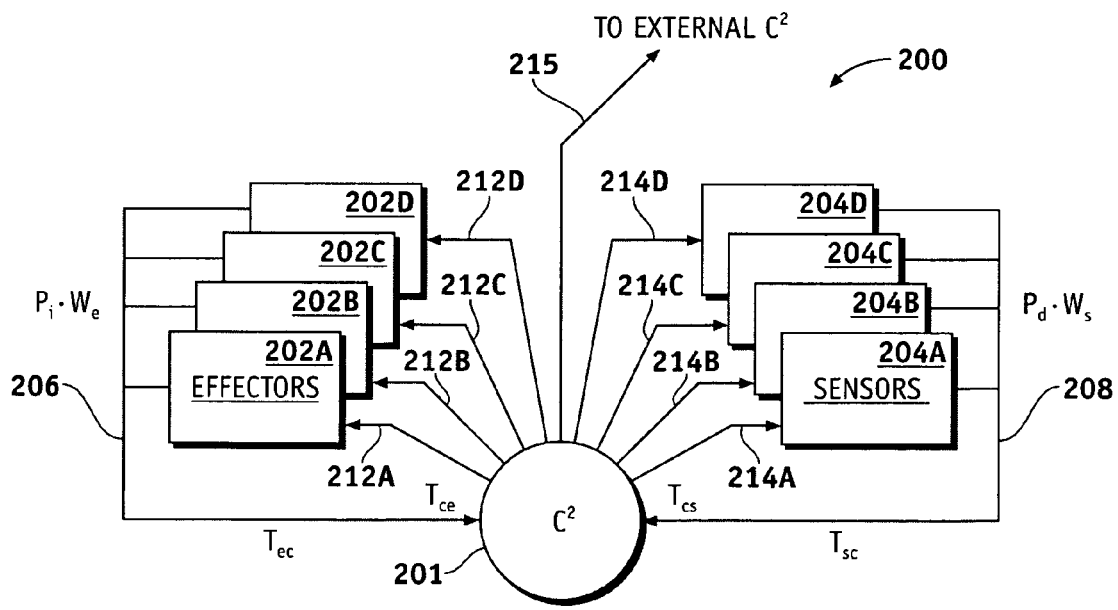
FIG. 2 is a block diagram showing an exemplary interaction of sensors, effectors and command and control within an exemplary network centric environment.

With primary reference now to FIG. 2, an exemplary participant 200 (corresponding to any of participants 102, 104, 106, 108 in FIG. 1) suitably has a command and control module 201 that has access to any number of sensors 204A-D and/or effectors 202A-D for obtaining information and/or carrying out desired tasks, respectively. Each sensor 204A-D may represent a radar system or other sensor capable of obtaining a target location, for example, whereas each effector 202A-D may represent a missile or other armament capable of engaging a target, or any other resource capable of taking any action. Participant 200 is additionally shown with an external data link 215 to an external command and control module or other resource associated with a remote participant or other entity. Participant 200 therefore has any number of local resources and may also have access to resources associated with any number of external participants, according to the design of scenario 100. Again, the numbers and types of resources available to each participant 200 will vary significantly from embodiment to embodiment.

To assess a MOE of the scenario, any number of numerical factors can be considered. Speed of command, for example, can be computed for participant 200 by simply determining the total time elapsed to complete objective 101. In a simple stovepipe scenario wherein participants only have access to local resources, the time to complete objective 101 is simply the sum of the time ($T_s$) to gather data 208 from sensors 204 and the time ($T_e$) to take actions using effectors 202A-D. The time $T_s$ to gather data may be expressed as the sum of the time $T_{cs}$ to issue acquire commands 214A-D to one or more sensors 204A-D (respectively) and the report time $T_{sc}$ to receive data 208 from the selected sensor(s) 204A-D. Similarly, the time $T_e$ to take actions may be expressed as the sum of the time $T_{ce}$ to issue action commands 212A-D to one or more effectors 202A-D (respectively) and the time $T_{ec}$ to receive confirmation 206 from the selected effectors 202A-D that the action has taken place. Other embodiments may additionally incorporate additional times to simulate processing delays by effectors 202A-D, sensors 204A-D and/or C2 module 201, and/or to consider other factors. Moreover, the total time may be normalized to a maximum or other reference time ($T_{max}$) and/or otherwise massaged to provide a numerical value that can be combined with other factors to arrive at MOE 125. Speed of command, for example, may be represented for each participant in various embodiments as:

$$SC = 1 - \frac{T_e + T_s}{T_{max}}$$

wherein $T_e$ and $T_s$ represent the total times elapsed for participant 200 to make use of all selected effectors 202A-D and sensors 204A-D, respectively. In more complex internetworked scenarios, additional times for gaining access to remote resources may be considered, as well as additional times for executing such access, as described more fully below. Further, the SC factors for two or more participants 200 may be summed or otherwise inter-combined to provide a more accurate representation of system-level behavior.

Other interoperability factors such as situational awareness factors and/or asset utilization factors can also be computed based upon the actions of participant 200. Situational awareness, for example, can be computed as any function of the number of sensors 204A-D used by participant 200 and the probability of success from each sensor 204A-D. In various embodiments, the probability of success ($P_d$) correlates to the probability of successfully detecting an object (e.g. target 101 in FIG. 1). This probability, in turn, may be scaled according to an optional sensor weight factor ($W_s$) to reflect real-world costs (in terms of monetary expense, human capital, material, and/or any other factors) of operating the sensor 204, to reflect biases imposed by mission commanders or others, or for any other purpose. Sensors 204 that reflect a relatively low marginal cost resource (e.g. a radar system), for example, may be assigned a relatively high weighting factor to encourage use, whereas a higher cost resource (e.g. a surveillance flight or satellite fly-over) may be much more expensive in terms of effort and cost. Weighting factors may be individually assigned to each sensor 204A-D, or a common sensor weight may be assigned to multiple sensors, as appropriate. Similarly, the probabilities of success may be individually and/or commonly assigned in any manner. As a result, the situational awareness (SA) factor for each participant 200 may be defined in various embodiments as:

$$SA = \frac{n_s}{N_s}[1 - (P_d)^{\gamma_s}] * W_s$$

wherein $n_s$ represents the number of sensors used and $N_s$ represents the total number of sensors 204A-D available to participant 200. The particular SA values for each participant 200 operating within a scenario 100 may be summed together or otherwise inter-combined to represent system level behavior.

Using similar concepts, an asset utilization factor (AU) can be readily determined as a function of the number of effectors ($n_e$), the probability of success ($P_i$) for each effector, and an optional effector weighting factor ($W_e$) that reflects the relative cost or preference associated with the use of one or more effectors 202A-D. As a result, the asset utilization (AU) factor may be defined in various embodiments as:

$$AU = \frac{n_e}{N_e}[1 - (P_i)^{n_e}] * W_e$$

wherein $n_e$ represents the number of sensors used by participant 200 and $N_e$ represents the total number of effectors 204A-D available to participant 200. Again, the AU factors of various participants 200 may be summed or otherwise aggregated to represent system level behaviors in various embodiments.

Accordingly, participant 200 selects any number of available sensors 204A-D and effectors 202A-D as well as any available external resources 215 to accomplish objective 101. As can be seen from the above equations, using additional sensors 204A-D or effectors 202A-D can improve situational awareness or asset utilization (respectively), but at the expense of decreased speed of command. By computing MOE 125 as a function of multiple factors, then, both the increase in SA or AU and the decrease in SC can be captured and evaluated.

FIG. 3 shows additional detail of an exemplary model 300 that can be implemented in a conventional spreadsheet application or the like. Model 300 as shown includes tables for sensor weighting factors ($W_s$) 302, effector weighting factors ($W_e$) 304 and maximum time allowed ($T_{max}$) 306 for each participant 102, 104, 106, 108 (FIG. 1), as well as parameters for maximum allowed resources 312, local sensor and effector delays 314, and probabilities of success 316 for sensors and effectors. Although model 300 shows parameters 312, 314 and 316 as applying equally to each participant 102, 104, 106, 108, alternate embodiments may assign individual parameter values to particular participants and/or resources. By adjusting the parameter values shown in model 300, the behavior and constraints of scenario 100 can be appropriately simulated and/or modified to determine desired resources and behaviors by the various participants. As noted above, the actions taken by one or more participants may be processed on an interactive ("game-like") basis with the user selecting particular actions, and/or may be automatically determined by a computer, randomizer or the like.

Model 300 also includes several tables 308 and 310 that define parameters used in inter-participant behaviors. In contrast to "stovepipe" scenarios wherein participants are limited to locally-available resources, interaction between participants 102, 104, 106, 108 can provide improved MOE 125. To simulate such behavior, model 300 suitably includes one or more parameters 308 defining external delay times for communications between participants 102, 104, 106, 108. These delay times may be modified in further embodiments by multiplying the delay by an "interoperability level"

310 that can be assigned by model 300 and/or selected and applied as desired by each participant. This interoperability level reflects the speed of communication existing between participants, and may reflect geographic, bandwidth, reliability and/or other considerations.

External communications and interoperability may be implemented and modeled in any manner. In a limited interoperability scenario, for example, participants may be allowed to request resources from $C^2$ modules 201 associated with remote participants 200. In such cases, the total command time used to compute speed of command (SC) factors would incorporate at least one inter-team delay 308, any delay associated with the resource itself (e.g. delays found in table 314), as well as any $C^2$ delay that may be present within model 300. By adjusting the local and external delay times to correspond to real-world conditions, the SC factor can accurately reflect behaviors in the network-centric environment. An exemplary formula for computing the speed of command (SC) factor is shown below:

$$SC = \sum 1 - \frac{T_{local} + T_{external} * (1 - L)}{T_{max}}$$

wherein $T_{local}$ represents total local delays associated with each action, $T_{external}$ represents total inter-participant delays associated with obtaining access to external resources, and L represents the optional interoperability level 310 present in some embodiments. In equivalent embodiments, interoperability level 310 is assumed to be zero, effectively having little or no effect upon the SC factor.

Figure 4:
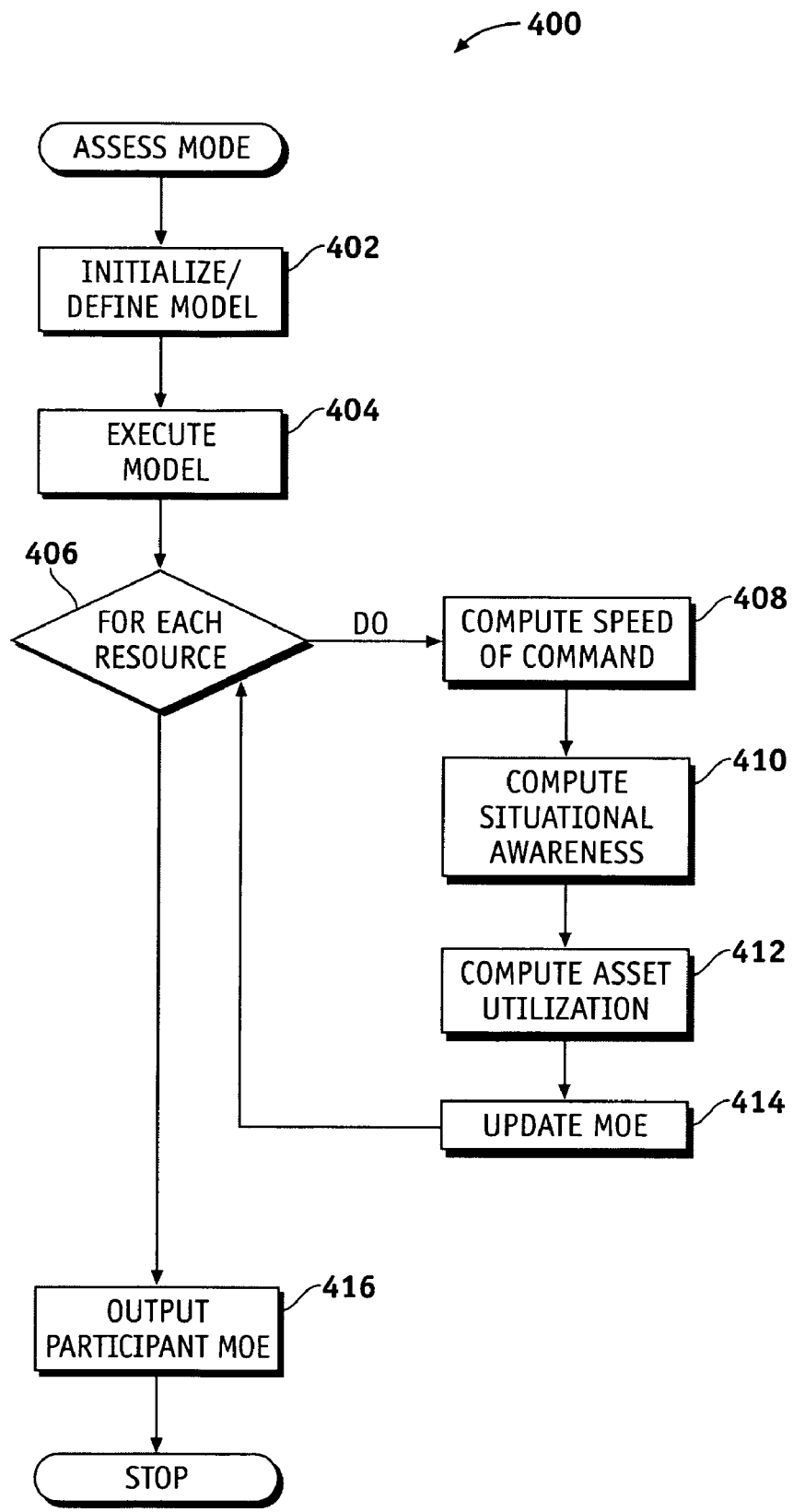
FIG. 4 is a flowchart of an exemplary method for assessing measurements of effectiveness in a network-centric environment.

With final reference now to FIG. 4, an exemplary process 400 for assessing a MOE 125 for a scenario 100 suitably includes the broad steps of defining and executing the computer model (steps 402 and 404), computing the various numerical representations of interoperability (steps 408, 410, 413), and determining the measure of effectiveness (steps 414 and/or 416) as a function of the numerical representations. Although FIG. 4 shows one exemplary process 400 that continually updates MOE 125 (step 414) for each resource used by a participant, equivalent embodiments may calculate MOE 125 and/or the particular numerical representations of interoperability at any point during or following the simulation, and/or may be logically arranged in any manner. The various processing blocks shown in FIG. 4 may represent modules (e.g. programming logic, data structures, applets or the like in any programming or scripting language) or instructions capable of being stored on any digital medium, including any type of random-access or read-only memory as well as any type of magnetic, optical or other storage medium. The various modules may also be transmitted as digital signals modulated on a carrier wave for short or long-range distribution. In various embodiments, process 400 is implemented within a conventional spreadsheet application such as the EXCEL application available from the MICROSOFT corporation of Redmond, Wash. Alternatively, one or more of the steps/modules in process 400 may be implemented manually and/or through the assistance of any digital computer programming.

With particular reference to FIG. 4, process 400 suitably begins by initializing or defining the computer model (step 402). Model 300 may be defined by simply entering or updating parameter values in a spreadsheet application, for example, and/or by changing programming logic to properly reflect the behaviors of the scenario being modeled. Step 402 need not involve creating the model itself, nor does step 402 need to be present in all embodiments. Execution of the model (step 404) varies from embodiment to embodiment, but may simply entail receiving user and/or computer generated selections as to desired resources available in the model. As resources are selected (step 406), the model suitably computes numerical factors related to interoperability such as speed of command (step 408), situational awareness (step 410) and/or asset utilization (step 412). These various factors can then be multiplied, added or otherwise mathematically combined to arrive at MOE 125 (step 414) that can be displayed, reported or otherwise provided as an output (step 416) to a user or other human or automated data consumer. Again, the particular steps shown in FIG. 4 can be modified, supplemented, combined or executed in any temporal or logical order in various alternate but equivalent embodiments.

While at least one exemplary embodiment has been presented in the foregoing detailed description, it should be appreciated that a vast number of alternate but equivalent variations exist. Although the systems and techniques described herein are frequently described with respect to computer spreadsheet implementations, for example, similar concepts could be readily applied with any other software or scripting languages, formats, environments, protocols and the like. Similarly, the invention is not limited to embodiments in the fields of aerospace or defense, but rather may be broadly implemented across a range of personal, corporate, industrial, governmental or other settings. While the foregoing detailed description will provide those skilled in the art with a convenient road map for implementing an exemplary embodiment of the invention, it should be appreciated that the embodiments described above are only examples, and are not intended to limit the scope, applicability, or configuration of the invention in any way. To the contrary, various changes may be made in the function and arrangement of elements described without departing from the scope of the invention as set forth in the appended claims and their legal equivalents.

What is claimed is:

1. A method of assessing measurements of effectiveness in a network-centric environment, the method comprising the steps of:
    executing a scenario described by a computerized model of the network centric environment, the model comprising a plurality of parameters describing sensors and effectors available within the scenario;
    computing numerical representations of the level of interoperability provided by the sensors and effectors operating within the computerized model, wherein the numerical representations are computed based upon a speed of command;
    determining a measure of effectiveness for the scenario as a function of the numerical representations; and
    providing the measure of effectiveness as an output.

2. The method of claim 1 wherein the numerical representations of the level of interoperability comprise a speed of command factor, a situational awareness factor, and an asset utilization factor.

3. The method of claim 1 wherein the numerical representations comprise a speed of command factor determined as a function of a cumulative time to execute tasks within the computerized model.

4. The method of claim 1 wherein the numerical representations comprise a speed of command factor (SC) determined as a function of a time relating to sensor use and a time relating to effector use.

5. The method of claim 4 wherein the time relating to sensor use is a summation of an acquire time and a report time for each of the sensors used in the scenario.

6. The method of claim 4 wherein the time relating to effector use is a summation of a command time and a confirm time for each of the effectors used in the scenario.

7. The method of claim 1 wherein the numerical representations comprise a speed of command factor (SC) determined as a function of a local execution time corresponding to local sensors and effectors and an external execution time corresponding to external sensors and effectors.

8. The method of claim 7 wherein the external execution time is scaled by a level of interoperability.

9. The method of claim 1 wherein the numerical representations comprise a speed of command factor (SC) determined according to the relationship:

$$SC = \sum 1 - \frac{T_{local} + T_{external} * (1 - L)}{T_{max}}$$

wherein $T_{local}$ is a local execution time, $T_{external}$ is an external execution time, L is a level of interoperability factor, and $T_{max}$ is the total time allowed for the scenario.

10. The method of claim 1 wherein the numerical representations comprise a situational awareness factor determined as a function of a probability of detection, a number of sensors used, and a total number of sensors available.

11. The method of claim 10 wherein the situation awareness factor is further determined as a function of a weighting factor.

12. The method of claim 1 wherein the numerical representations comprise a situational awareness factor (SA) determined according to the relationship:

$$SA = \frac{n_s}{N_s}[1 - (P_d)^{n_s}] * W_s$$

wherein $P_D$ is the probability of successful detection, $n_s$ is the number of sensors used in the scenario, $N_s$ is the total number of sensors available, and $W_s$ is a weighting factor of a sensor.

13. The method of claim 1 wherein the numerical representations comprise an asset utilization factor determined as a function of a probability of success, a number of effectors used, and a total number of effectors available.

14. The method of claim 13 wherein the asset utilization factor is further determined as a function of a weighting factor.

15. The method of claim 1 wherein the numerical representations comprise an asset utilization factor determined according to the relationship:

$$AU = \frac{n_e}{N_e}[1 - (P_i)^{n_e}] * W_e$$

wherein $P_i$ is the probability of successful detection, $n_e$ is the number of effectors used in the scenario, $N_e$ is the total number of effectors available, and $W_e$ is a weighting factor of an effector.

16. A computer-readable medium having software instructions stored thereon, the software instructions configured to execute the method of claim 1.

17. A system for assessing measurements of effectiveness in a network-centric environment, the system comprising:
 a computerized model of a scenario executing within a network centric environment, the computerized model comprising a plurality of parameters describing sensors and effectors available within the scenario;
 an evaluation module configured to determine numerical representations of the level of interoperability provided by the sensors and effectors operating within the computerized model, wherein the numerical representations are computed based upon a speed of command; and
 an output module configured to provide a measure of effectiveness for the scenario as a function of the numerical representations.

18. The system of claim 17 wherein the numerical representations of the level of interoperability comprise a speed of command factor, a situational awareness factor, and an asset utilization factor.

19. A system for assessing measurements of effectiveness in a network-centric environment, the system comprising:
 means for executing a scenario described by a computerized model of the network centric environment, the model comprising a plurality of parameters describing sensors and effectors available within the scenario;
 means for determining a speed of command factor, a situational awareness factor, and an asset utilization factor as a function of the sensors and effectors operating within the computerized model; and
 means for outputting a measure of effectiveness for the scenario as a function of the speed of command, situational awareness and asset utilization factors.

20. The system of claim 19 wherein the means for executing and determining are implemented within a computer spreadsheet application.

* * * * *